Figure 4:
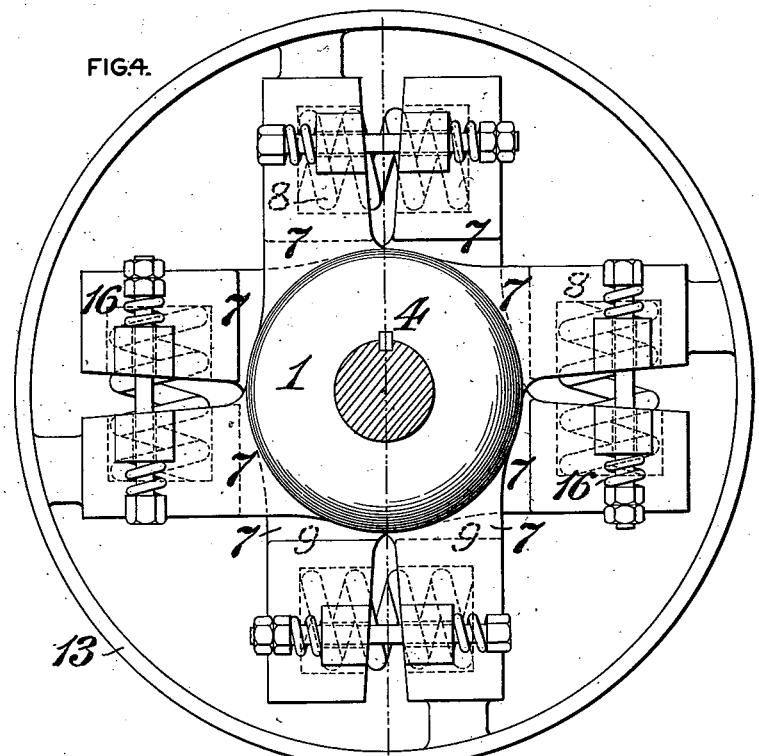

(No Model.)  3 Sheets—Sheet 1.
F. M. RITES.
FLEXIBLE COUPLING.
No. 538,386. Patented Apr. 30, 1895.
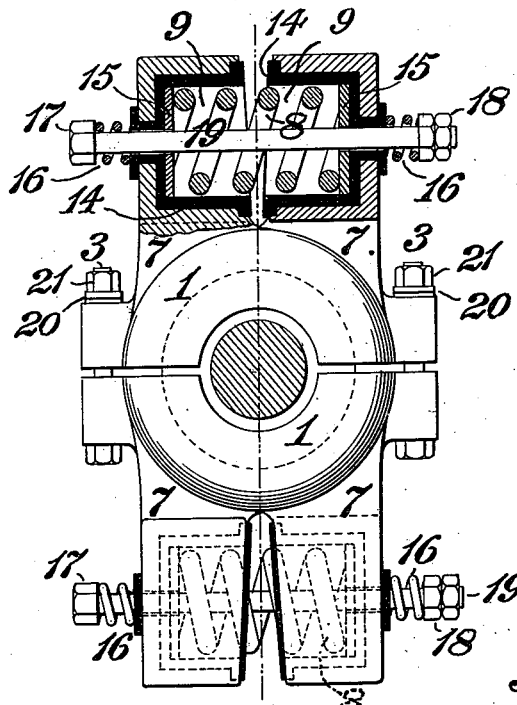
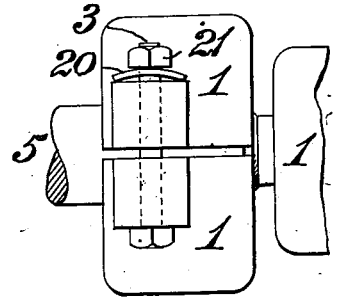
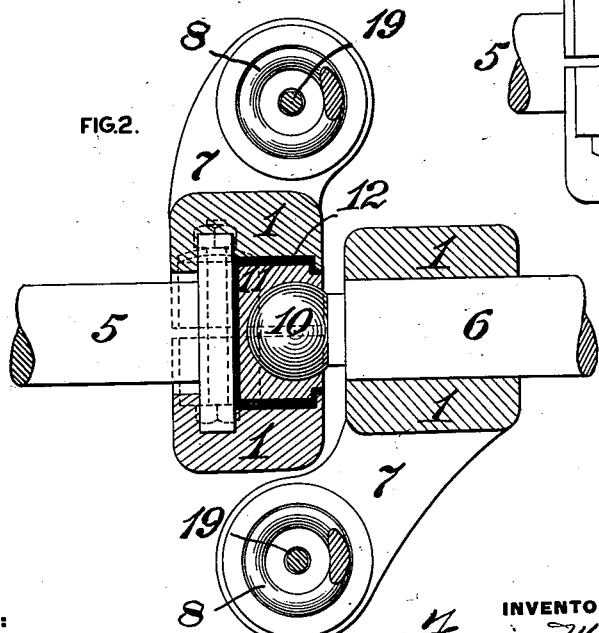
WITNESSES:
T. J. Hogan.
Chas. F. Miller.
INVENTOR,
Francis M. Rites,
by J. Snowden Bell,
Att'y.

(No Model.)

F. M. RITES.
FLEXIBLE COUPLING.

No. 538,386. Patented Apr. 30, 1895.

3 Sheets — Sheet 2.

WITNESSES:
T. J. Hogan,
Chas. F. Miller.

INVENTOR,
Francis M. Rites,
by Snowden Bell
Att'y.

(No Model.)　　　　　　　　　　　　　3 Sheets —Sheet 3.
F. M. RITES.
FLEXIBLE COUPLING.

No. 538,386.　　　　　　　　　Patented Apr. 30, 1895.

WITNESSES:　　　　　　　　　　INVENTOR,
T. J. Hogan.　　　　　　　　　Francis M. Rites,
Chas. F. Miller.　　　　　　　by J. Snowden Bell
　　　　　　　　　　　　　　　　　Att'y.

UNITED STATES PATENT OFFICE.

FRANCIS M. RITES, OF PITTSBURG, PENNSYLVANIA.

FLEXIBLE COUPLING.

SPECIFICATION forming part of Letters Patent No. 538,386, dated April 30, 1895.

Application filed October 16, 1894. Serial No. 526,045. (No model.)

*To all whom it may concern:*

Be it known that I, FRANCIS M. RITES, a citizen of the United States, residing at Pittsburg, in the county of Allegheny and State of Pennsylvania, have invented or discovered a certain new and useful Improvement in Flexible Couplings, of which the following is a specification.

The object of my invention is to provide an appliance of the type of shaft connections ordinarily known as spring couplings, which shall embody the advantages of simplicity and comparatively inexpensive construction, and effectiveness and freedom from liability to derangement in operation.

The improvement claimed is hereinafter fully set forth.

In the operation of spring couplings as ordinarily heretofore employed, and more particularly those having tangentially acting helical springs, considerable objection has been encountered, due to the disturbing influence induced by centrifugal force on the springs and their connections. If, at any time, the strain of the load becomes approximately that of the rating of the coupling, additional strain is imposed by centrifugal force on the outer fibers of the springs, which causes the springs to assume a condition of permanent set, by which they are weakened or broken. Another objection to couplings of this type, as heretofore constructed, is that the action of centrifugal force drives out the lubricant of the pins which makes the spring connections, so that, after a short period of operation, the pins become dry, and cut or wear rapidly. Again, couplings of this type, while presenting the advantages of flexibility in all directions, are also elastic, and require that bearings should be provided to support the shaft sections on each side of the coupling.

My invention attains the operative advantage that as the resistance of the load increases, and the springs correspondingly yield thereto, the outer portions of the recesses which receive them approach more rapidly and impose an additional compression strain on the adjacent portions of the spring, to oppose the action of centrifugal force which tends to extend the springs. The construction also enables connecting pins to be wholly omitted, with a corresponding advantage in simplicity and freedom from derangement, as well as exemption from the objection before noted to the use of said springs. In lieu of the ordinary bearings on both sides of the coupling to support the adjacent ends of the shaft sections, a bearing for one shaft section only need be employed, and the other section can be supported through a ball and socket joint with its companion section. While this does not detract from the flexibility of the shafting as a whole, it effects a desirable simplification in the omission of one bearing.

In order to prevent undue or excessive strain being applied to the springs in operation, the parts may be so proportioned that the ends of the opposing arms in which the recesses which receive the springs are formed may abut when the load becomes greater than can be safely carried by the springs, thus driving, under such conditions, without the element of flexibility.

In order to relieve the coupling from the effect of impact, while preserving a certain degree of flexibility, an additional spring force is provided in the form of elastic buffers which receive the impact and relieve the springs. To prevent the objectionable action known as "backlash," auxiliary springs, which are comparatively weak, and are capable of greater extension than the primary springs, are provided, and serve to prevent recoil of the parts when the load is removed and the pressure on the primary springs is released. A device is also provided for preventing accidents resultant upon inability to quickly check the speed of the driven shaft when suddenly overloaded, by reason of the inertia of a fly wheel momentarily exerting sufficient force to damage or destroy portions of the driven mechanism. This device, which is shown in the form of a frictional connection between portions of the coupling, is inoperative except when the engine is loaded to the danger point, at which it yields and permits the driven members to come instantly to rest, while the driving members are stopped more slowly.

Figure 5:
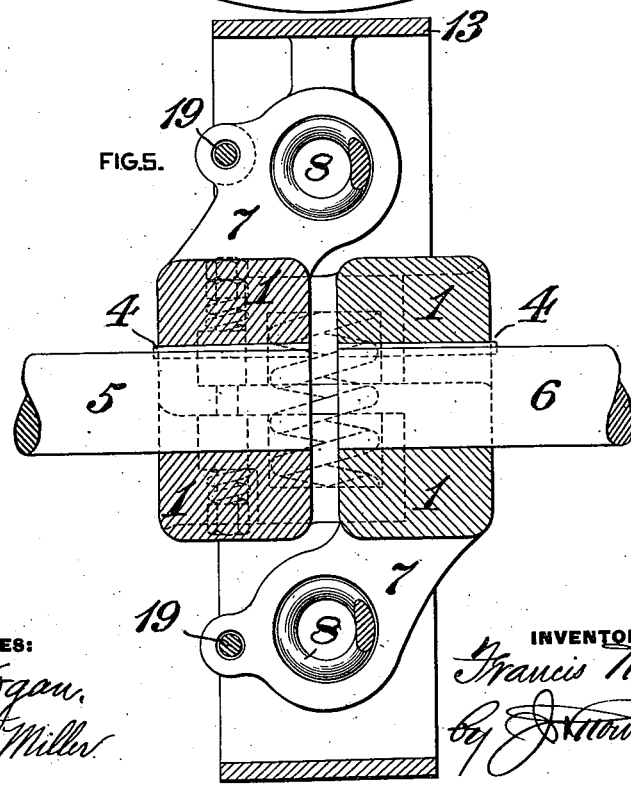
Figure 6:
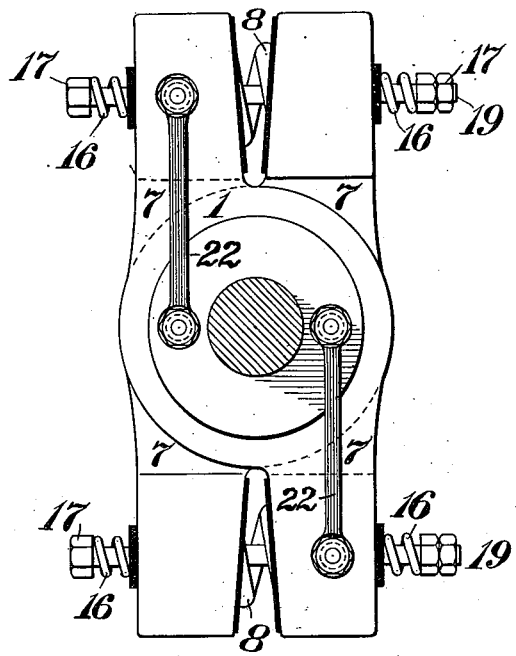

In the accompanying drawings, Figure 1 is an end view, partly in elevation and partly in section, of a shaft coupling illustrating an application of my invention; Fig. 2, a longitudinal central section through the same; Fig. 3, a partial side view in elevation; Fig. 4, an end view, in elevation, showing a structural modification; Fig. 5, a longitudinal section through the same; Fig. 6, a view, in elevation, illustrating a modification; and Fig. 7, a longitudinal central section through the same.

In the practice of my invention, I provide two coupling heads or carriers 1, 1 which may be either integral or formed in two connected sections, and which are adapted to be secured in any suitable manner, as by clamping bolts 3, or keys 4, upon the adjacent ends of two sections of shafting 5, 6, which are designed to be coupled through a flexible connection. Each of the coupling heads 1, 1, is provided with two or more arms 7, which project from the heads, in planes parallel with an axial plane of the shaft sections, and are so relatively located on the respective heads that each of the arms of one head faces or stands opposite to an arm projecting in the same direction from the other head. The arms of one head do not abut against those of the other, a sufficient space being left between their adjacent faces to admit of a determined degree of compression of helical springs, 8, through which power is transmitted from the driving to the driven section of shafting. The springs 8 are inclosed in recesses or chambers 9, in the outer ends of the arms 7, extending substantially at right angles to said arms, and bear, at one end, on an arm of one coupling head, and, at the opposite end, on an arm of the other, pressure of the load applied to the arms of the coupling load of the driving section of shafting compressing the springs and being transmitted through them, when under compression, to the arms of the coupling head of the driven section of shafting. A flexible connection is thus provided for the two sections of shafting, up to the limit of safe strain upon the springs, at which the latter are compressed so far that the adjacent faces of the arms of the respective heads abut, and the driven section of shafting is then rotated by their direct action one on another, without flexibility of connection with the driving section.

A ball or projection 10, having the form of a portion of a sphere, may be formed upon the end of one of the shaft sections, said ball fitting in a correspondingly recessed socket 11, in the coupling head of the other shaft section, so as to admit of the support of both sections, adjacent to their connection, by a single bearing. Suitable insulating material 12 may also be interposed between the socket 11 and the coupling head 1 in which it is fitted, so as to prevent the passage of an electric current from one shaft section to the other. It will be obvious that a greater or less number of arms may be employed, in the discretion of the constructor, two arms being shown upon each coupling head in Fig. 1, and four in Fig. 4. The coupling heads of Figs. 1 to 3 are each formed in two sections, secured upon their respective shaft sections by clamping bolts 3, while those of Figs. 4 and 5 are integral and are secured upon the shaft sections by keys 4. In the latter instance, also, an inclosing case or rim 13 is formed upon the arms of one of the coupling heads.

To relieve the coupling from the effect of impact, while preserving a certain degree of flexibility, buffers 14, of rubber or other suitable elastic material, may be fitted in the recesses 9 of the arms, as shown in Fig. 1. In such case, the compression springs 8 may be made to bear on washers 15, fitting against the portions of the buffers at the bottoms of the recesses, and the buffers, which project slightly beyond the adjacent faces of the arms, may be flanged, as shown, to obtain increased bearing surface. After the buffers have been compressed to the level of the faces of the arms, which should be at the limit of safe strain on the springs, the faces of the arms abut directly, and transmit the driving power without spring intermediation.

In order to prevent "backlash," auxiliary springs 16, of comparatively slight tension, and capable of greater extension than the primary springs 8, and acting in opposite direction to the primary springs, may be fitted to bear against the outer faces of the arms 7, in reverse direction to the springs 8. The auxiliary springs 16 are shown as held in position by heads 17 and nuts 18, on bolts 19, passing through the recesses of the arms, or through lugs on the outside thereof, the springs bearing on the heads and nuts, and on the outer faces of the arms, and opposing the rapid movement of the arms of one head away from those of the other, upon reduction of driving power.

In such special service as direct connection for electric lighting or electric railroads, excessive overloads are sometimes encountered, which seriously damage or destroy the apparatus, through inability to check the speed of the engine and dynamo sufficiently quickly. Although the overload, in such cases, may be much beyond the power of the engine, yet the inertia of the flywheel is usually sufficient to momentarily exert sufficient power to wreck the dynamo. To obviate such objectionable tendency, a device is provided which yields when the load of the engine reaches a determined point at which there may be danger of the above result, and instantly releases the driven mechanism from the action of the driver, permitting the latter to continue its rapid movement without damage to the former. This device is shown in the drawings in the form of a yielding frictional connection between the two sections of the coupling heads, which is effected by interposing springs 20, between the faces of the lugs on the coupling heads through which the clamping bolts 3 pass, and the nuts 21 of said bolts. The degree of friction is gaged by the pressure on the springs, so that they may yield and permit the coupling heads to slip on the shaft sections under the proper load, while maintaining the rotative connection of the coupling heads and shaft sections so long as the load remains normal and safe.

Figure 7:
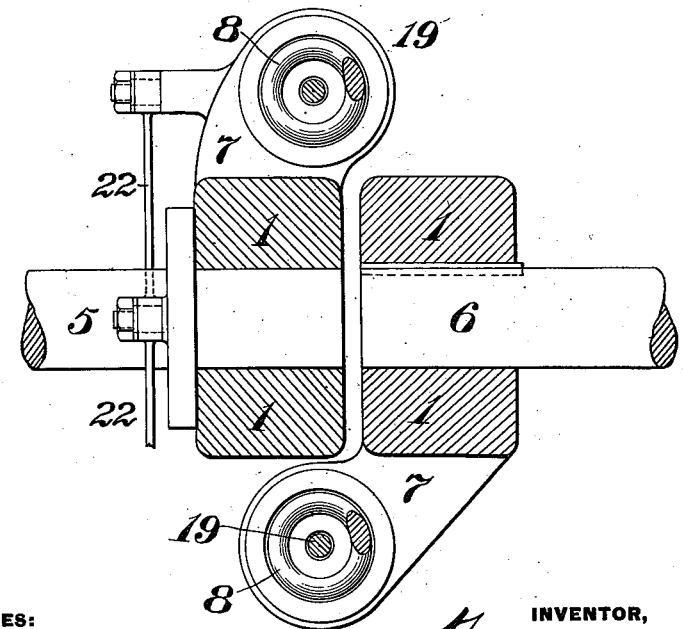

It will be obvious that yielding devices of specific construction other than illustrated may be substituted therefor without change of operative principle or departure from my invention. Thus, for example, the same function may be performed by link connections from the heads to the shaft sections, made of such strength as to maintain rotative connection during normal strain, but to break and thereby sever such connection, and thus act as a safety device to prevent damage to more valuable portions of the mechanism, under sudden and abnormal increase of load. A modification of this character is shown in Figs. 6 and 7.

I claim as my invention and desire to secure by Letters Patent—

1. In a shaft coupling, the combination, substantially as set forth, of two coupling heads or carriers, adapted to be secured upon the adjacent ends of two shaft sections, arms projecting from each of said sections and having recessed or chambered ends, the openings of which, on one coupling head, face those on the other, on opposite sides of an axial plane through the shaft sections, and helical springs, each fitting in the recesses of two opposite and facing arms, and bearing, when under compression by load, in opposite directions on said arms.

2. In a shaft coupling, the combination, substantially as set forth, of two coupling heads or carriers, adapted to be secured upon the adjacent ends of two shaft sections, arms projecting from one coupling head opposite to similar projecting arms on the other, compression springs interposed between, and bearing in opposite directions on said arms, and yielding buffers on the arms which resist the impact of an excess of load upon the springs.

3. In a shaft coupling, the combination, substantially as set forth, of two coupling heads or carriers, adapted to be secured upon the adjacent ends of two shaft sections, arms projecting from one coupling head opposite to similar projecting arms on the other, compression springs interposed between, and bearing in opposite directions on said arms, and auxiliary springs exerting pressure on said arms in opposite direction to the compression springs.

4. In a rotary coupling, the combination, substantially as set forth, of two coupling heads or carriers, adapted to be secured upon the adjacent ends of two shaft sections, arms projecting from one coupling head opposite to similar projecting arms on the other, compression springs interposed between and bearing in opposite directions on said arms, and a ball and socket connection through which one shaft section is supported on the other.

5. In a rotary coupling the combination, substantially as set forth, of two coupling heads or carriers adapted to be secured upon the adjacent ends of two shaft sections, springs interposed between arms on said coupling heads, and a yielding device permitting displacement of one of said coupling heads relatively to its shaft section under excess of load.

6. In a rotary coupling, the combination, substantially as set forth, of two coupling heads or carriers, adapted to be secured upon the adjacent ends of two shaft sections, springs interposed between arms on said coupling heads, a clamping bolt connecting one of said coupling heads with its shaft section, and a spring through which said bolt bears on the coupling head.

In testimony whereof I have hereunto set my hand.

FRANCIS M. RITES.

Witnesses:
 J. SNOWDEN BELL,
 F. E. GAITHER.